United States Patent [19]

Petit

[11] 4,301,446
[45] Nov. 17, 1981

[54] DIGITAL TRANSMISSION SYSTEM WITH A DOUBLE ANALOG INTEGRATOR DELTA SIGMA CODER AND A DOUBLE DIGITAL INTEGRATOR DELTA SIGMA DECODER

[76] Inventor: Jean-Pierre Petit, 16, rue le Peletier, Treguier, France, 2220

[21] Appl. No.: 170,043

[22] Filed: Jul. 17, 1980

[30] Foreign Application Priority Data

Jul. 20, 1979 [FR] France .............................. 79 18862

[51] Int. Cl.³ ............................................ H03K 13/02
[52] U.S. Cl. ...................... 340/347 AD; 340/347 NT; 340/347 DA
[58] Field of Search ... 340/347 AD, 347 M, 347 DA, 340/347 NT; 332/11 D; 375/27, 28, 33

[56] References Cited

U.S. PATENT DOCUMENTS

| | | | |
|---|---|---|---|
| 3,192,371 | 6/1965 | Brahm | 340/347 AD |
| 3,659,288 | 4/1972 | Taylor | 340/347 AD |
| 3,820,111 | 6/1974 | Candy | 340/347 AD |
| 3,925,731 | 12/1975 | Brainard | 332/11 D |
| 3,955,191 | 5/1976 | Lambourn | 340/347 AD |
| 3,956,700 | 5/1976 | Condon | 332/11 D |
| 4,009,475 | 2/1977 | Defreitas | 340/347 AD |
| 4,107,669 | 8/1978 | Tewksbury | 340/347 AD |
| 4,156,871 | 5/1979 | Lambourn | 340/347 AD |

OTHER PUBLICATIONS

Everard, "Electronics Letters", Jul. 22, 1976, vol. 12, No. 15, pp. 379–380.

*Primary Examiner*—Charles D. Miller
*Attorney, Agent, or Firm*—Lowe, King, Price & Becker

[57] ABSTRACT

Delta-Sigma noise-shaping coder with two analog integrators and Delta-Sigma decoder with two digital integrators. The coder comprises an operational amplifier with two analog integrators in its feedback loop and two cascaded flipflops both connected to the input of the operational amplifier through resistors having a predetermined ratio. The configuration of the integrators is particular and results of the identification of the z-transfer function of the coder to be designed with the p-transfer function of a known integrator (p, Laplace's variable). The decoder comprises a digital integrator-filter of order two and two cascaded flipflops both connected to the input of the filter through amplifiers having gains in a predetermined ratio.

6 Claims, 10 Drawing Figures

$$B(z) = \frac{1}{H_{NS}(z)} = \frac{1}{1-C(z)}$$

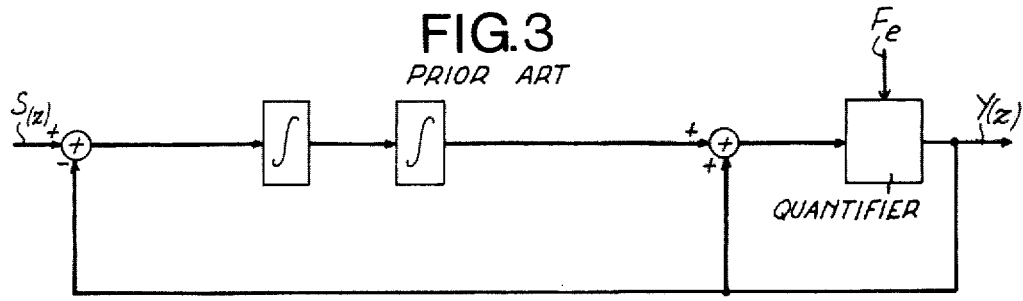
FIG.3 *PRIOR ART*
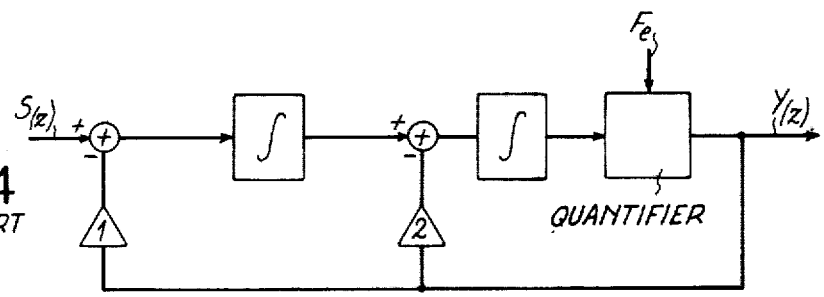
FIG.4 *PRIOR ART*
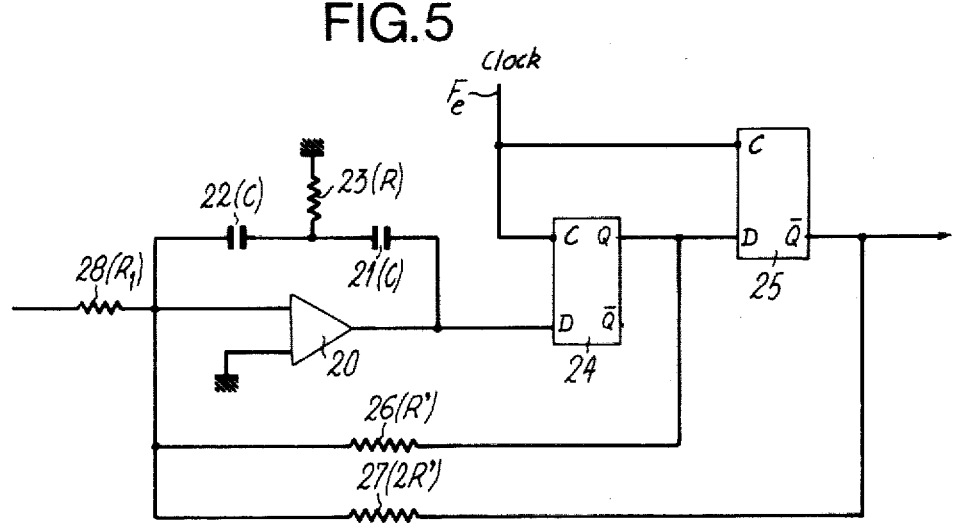
FIG.5

DIGITAL TRANSMISSION SYSTEM WITH A DOUBLE ANALOG INTEGRATOR DELTA SIGMA CODER AND A DOUBLE DIGITAL INTEGRATOR DELTA SIGMA DECODER

BACKGROUND OF THE INVENTION

1. Field of the Invention

The present invention generally concerns PCM digital coding and decoding of speech signals and more particularly analog to digital error feedback coders which shape the spectral distribution of the quantizing error so as to reduce in-band noise.

More precisely, the invention concerns a digital transmission system, the transmit station of which includes a RC analog filter which limits the speech analog waveform to be transmitted to 4 kHz, a noise-shaping waveform coder of order higher than one, which codes the limited analog speech waveform into one-bit samples at an oversampling rate of 2.048 MHz, a digital filter which brings the sampling rate from 2.048 MHz to 8 kHz and the sample bit number from 1 to 12 and a compressor which brings back the sample bit number from 12 to 8. The receive station includes an expander which brings back the sample bit number from 8 to 12, a digital filter which oversamples the digital waveform from 8 kHz to 32 kHz, a Delta-Sigma digital decoder including a double integrator which converts the sampling rate from 32 kHz to 2.048 MHz and the sample bit number from 12 to 1, and a RC analog low pass filter.

2. Description of the Prior Art

The use of Delta-Sigma coders in PCM A/D converters has been proposed in the article "A single channel PCM coder" by J. D. Everard, IEEE, ICC 1978, Toronto, June 1978. In this article, the writer proposes to convert in the encode-direction the analog signal to digital form using a modified Delta-Sigma modulator operating at 2.048 kMHz, thus producing codewords with a single bit per sample magnitude. Conversion of the linear PCM codewords to compressed PCM is accomplished using a further digital transformation. In the decode-direction, the compressed PCM codewords are processed through a compressed PCM to linear PCM converter, then the linear PCM codewords are processed by a digital Delta-Sigma modulator to produce a single bit per sample code at 2.048 kMHz.

The sampling frequency of 2.048 kHz chosen by EVERARD does not allow to meet in Delta-Sigma coders the signal to noise ratio specifications recommended by the Comite Consultatif Télégraphique et Telephonique for PCM transmission systems (see CCITT, orange book, Vol. III-2, recommendation G 711, 712).

It has been also observed (see "Improvements to the Delta-Sigma modulators when used for PCM encoding" by J. D. EVERARD, Electronics Letters, July 22nd, 1976, Vo. 12, No. 15, pages 379-380) that the quantization noise distribution in Delta-Sigma modulators has an approximately square low relationship with frequency up to half the Delta-Sigma modulator sample rate. The exact distribution is intimately related to the amplitude probability density function of the input signal in such a way that very low output signal levels result in increased quantization noise within the signal band. This is undesirable for a PCM encoder application since very large clock rates are required to maintain adequate performance. Therefore, it has been proposed to increase the signal to noise ratio at low levels by injecting a jamming signal at such a frequency that it is filtered by the digital subsampling filter. This process is not satisfactory since it increases the signal to noise ratio at low levels but deteriorates it at high levels.

In brief, Delta-Sigma modulators used as A/D converters in PCM links cannot meet the CCITT specifications if the sample rate is not higher than 2.048 MHz and if the Delta-Sigma modulators are of the first order.

The object of the invention is to provide a Delta-Sigma coder of order two which operates at substantially 2 MHz and meets the specifications for A/D converters in PCM links.

Another object of the invention is to provide a Delta-Sigma coder which comprises a single operational amplifier and a single adder means.

SUMMARY OF THE INVENTION

The invention concerns a Delta-Sigma noise-shaping coder with two analog entegrators and a Delta-Sigma decoder with two digital integrators. The coder comprises an operational amplifier with two analog integrators in its feedback loop and two cascaded flipflops both connected to the input of the operational amplifier through resistors having a predetermined ratio. The configuration of the integrators is particular and results of the identification of the z-transfer function of the coder to be designed with the p-transfer function of a known integrator (p, Laplace's variable). The decoder comprises a digital intergrator filter of order two and two cascaded flipflops both connected to the input of the filter through amplifiers having gains in a predetermined ratio.

BRIEF DESCRIPTION OF THE DRAWING

FIGS. 2, 3 and 4 are prior art Delta-Sigma coders of the first and second orders;

FIG. 5 is a block-diagram of the noise-shaping coder with two analog integrators according to the invention;

DESCRIPTION OF THE PREFERRED EMBODIMENTS

Noise-shaping coders are disclosed in the article of "Oversampled" linear Predictive and Noise-shaping Coders of Order N>1", by Stuart K. TEWKSBURY et Robert W. HALLOCK, IEEE Transactions on Circuits and Systems, Vol. Cas-25, No. 7, July 1978.

Figure 1:
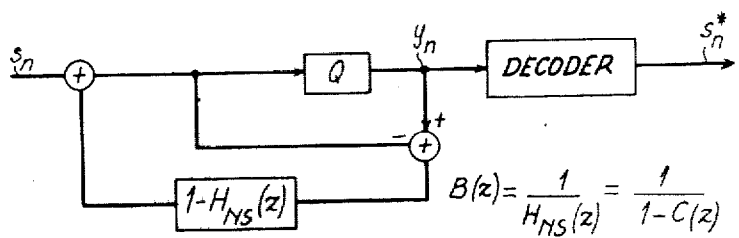
FIG. 1 is a block-diagram of a noise-shaping coder as taught by Stuart K. TEWKSBURY et al.

In FIG. 1 which is no other than FIG. 4 of the above article, B(z) is a feed-forward filter, C(z) a feedback filter and Q(z) is a quantifier. S(z), Y(z) and Q(z) are the z-transforms of the coder input sample sequence, the coder output sample sequence and the quantizing error sequence. These quantities are related by .

$$Y(z) = [B(z) S(z) + Q(z)] / [1 + B(z)C(z)]$$

The coder is a noise-shaping coder if $$Y(z) = S(z) + H_{NS}(z)Q(z) \quad (1)$$

Equation (1) defines constraints on B(z) and C(z). The constraints are $$B(z)/[1 + B(z)C(z)] = 1 \quad (2)$$

$$H_{NS}(z) = 1/[1 + B(z)C(z)] \quad (2')$$

from which we obtain $$B(z) = 1/[1 - C(z)] \quad (3)$$

$$H_{NS}(z) = 1 - C(z) \quad (4)$$

Figure 2:
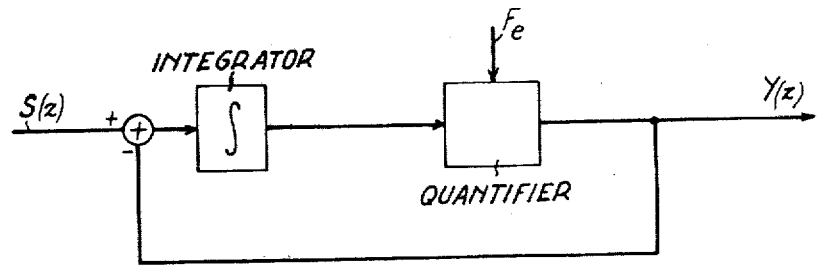

The conventional Delta-Sigma coder of FIG. 2 is a noise-shaping coder with an integrator of order one. In this case, we have $$B(z) = z^{-1}/(1 - z^{-1}) \quad (5)$$

wherein B(z) is the z-transfer function of an integrator followed by a blocker of order zero. Further $$C(z) = 1$$

Then $$Y(z) = z^{-1}S(z) + (1 - z^{-1})Q(z) \quad (6)$$

which, if we disregard $z^{-1}$ which is a mere delay, is of the form of equation (2) which defines a noise-shaping coder.

Noise-shaping coders with integrator of order N=2 are represented in FIG. 3 which is no other than FIG.-8of U.S. Pat. No. 4,107,669 issued Aug. 15, 1978 to Stuart Keene TEWKSBURY, modified in a manner well-known to those skilled in the art and in FIG. 4 which is no other than the Ritchce's form of noise-shaping coder represented on FIG. 13 in the article of TEWKSBURY previously cited. It is reminded that the gains of the amplifiers in FIG. 4 are equal to the coefficients of a power of a binome.

In the coders of FIGS. 3 and 4, there are at least two adders in the path of the input signal between the input terminal and the quantifier. In the noise-shaping coder of the invention which comprises an integrator of order two, there is only one adder and the integrator is a particular integrator.

Before disclosing the coder of the invention in FIG. 5, we shall explain the theoretical approach which was followed: As already said, the transfer function B(z) of the feed-forward filter in a Delta-Sigma coder of order one comprises the z-transfer function of the integrator and the z-transfer function of the quantifier which is a blocker of order zero, a flipflop for example. This z-transfer function B(z) is given by equation (5).

Let us take for z-transfer function of the feed-forward filter of the Delta-Sigma coder of order two:

$$B(z) = z^{-1}/(1 - z^{-1})^2 \quad (7)$$

which is the simpler and the more feasible z-transfer function of order two.

The noise shaping filter of order two has the z-transfer function $$H_{NS}(z) = (1 - z^{-1})^2 \quad (8)$$

(see article by TEWKSBURY, page 440, formule "4.1").

From formula (2)

$$C(z) = (B(z) - 1)/B(z) = (2 - z^{-1}) \quad (9)$$

Therefore, with B(z) given by formula (7), C(z) given by formula (9) and $H_{NS}(z)$ given by formula (8), the z-transfer function of the coder is $$Y(z) = z^{-1}S(z) + (1 - z^{-1})^2 Q(z) \quad (10)$$

which has the type of equation (1). It appears that the feedback filter C(z) must have a delay $z^{-1}$ which can be easily implemented by a flipflop.

The digital filter of order two having as its z-transfer function equation (7) is implemented in the following manner. The z-transfer function (7) is the z-transform of a function F(p) multiplied by the transfer function of a blocker of order zero which is $$(1 - e^{-pT})/p$$

Therefore:

$$z\text{-transform}\left[\frac{1 - e^{-pT}}{p} \times f(p)\right]$$

$$= \frac{z^{-1}}{(1 - z^{-1})^2} = (1 - z^{-1}) \times z\text{-transform}\left[\frac{F(p)}{p}\right]$$

where p is the Laplace's variable F.
Whence $$z\text{-transform}\left[\frac{F(p)}{p}\right] = \frac{z^{-1}}{(1 - z^{-1})^3} \quad (11)$$

The solution of the equation (11) is:

$$F(p) = \frac{p + 2/\tau}{2\tau p^2} \quad (12)$$

with $z = e^{j\omega T}$. Effectively $$z\text{-transform}\left[\frac{p + 2/\tau}{2\tau p^3}\right] = \frac{1}{2\tau} z\text{-transform}\left[\frac{1}{p^2} + \frac{2}{\tau p^3}\right]$$

$$= \frac{1}{2\tau} \frac{\tau z^{-1}}{(1 - z^{-1})^2} + \frac{1}{2\tau^2} \frac{\tau^2 z^{-1}(1 + z^{-1})}{(1 - z^{-1})^3}$$

$$= \frac{z^{-1}}{(1 - z^{-1})^3}$$

The transfer function (12) can be implemented with a single operational amplifier such as that represented in FIG. 5. The p-transfer function of the circuit in FIG. 5 is:

$$F(p) = \frac{-2RC\left(p + \frac{1}{2RC}\right)}{R_1 R C^2 p^2} \quad (13)$$

$$F(p) = -(16 R/R_1)\frac{p + \frac{1}{2RC}}{8 R C p^2} = G F(p)$$

Equation (13) can be identified to equation (11) by taking:

$$G = -16(R/R_1)$$

$$\tau = 1/f_e = 4i\, RC$$

The double integrator Delta-Sigma coder represented in FIG. 5 comprises an operational amplifier 20 having in its feedback loop a double integrator formed by two capacitors 21 and 22 in series and having a capacitance C and a resistor in parallel 23 having a resistance R. The output of operational amplifier 20 is connected to two cascaded flipflops 24 and 25 whose outputs are connected to the input of operational amplifier 20 through resistors 26 and 27 having respective resistances R' and 2R'. The resistance value of resistor 27 is indeed twice that of resistor 26 for allowing the two flipflops 24, 25 and the two resistors 26, 27 to implement the feedback filter C(z):

$$C(z) = 2 - z^{-1} \quad (9)$$

The output terminal of the first flipflop 24 is Q and the output terminal of the second flipflop 25 is $\overline{Q}$ for taking account of the sign minus before $z^{-1}$ in formula (9).

Experiments made by the applicant have shown that, if the value of resistor R' is chosen equal to the value $R_1$ of the input resistor 28, $$R' = R_1$$

the voltage at the output of filter C(z) reach excessive values which can involve blocking. To avoid this drawback, instead of taking $$C(z) = 2 - z^{-1} \quad (9)$$

one takes:

$$C(z) = 2(2 - z^{-1}) \quad (9')$$

Equation (10) then becomes:

$$Y(z) = \frac{z^{-1} S(z)}{2\, T(z)} + \frac{(1 - z^{-1})^2 Q(z)}{2\, T(z)} \quad (10')$$

with $$T(z) = \tfrac{1}{2} + z^{-1} - \frac{z^{-2}}{2}$$

The modulus of the transfer function 1/T(z)

$$\left|\frac{1}{T(z)}\right| = \frac{1}{|1 + j\sin\omega\tau|}$$

is equal to:

$$\frac{1}{(1 + \sin^2\omega\tau)^{\frac{1}{2}}}$$

Figure 6:
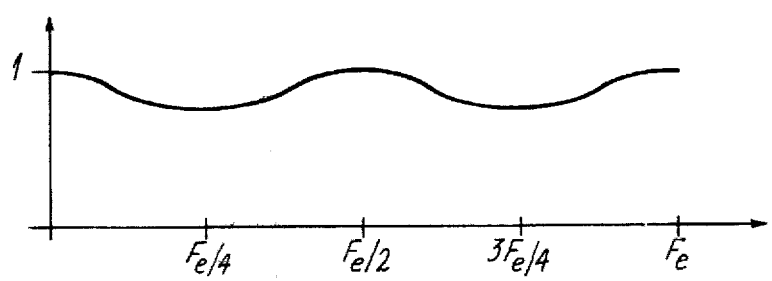
FIG. 6 is a curve showing the perturbation borne by a filtering function.

This modulus is represented by a curve in FIG. 6. The transfer function does not practically perturb the signal in the passband and does not present infinite peaks. Then it is convenient to take:

$$R' = R_1/4$$

Figure 7:
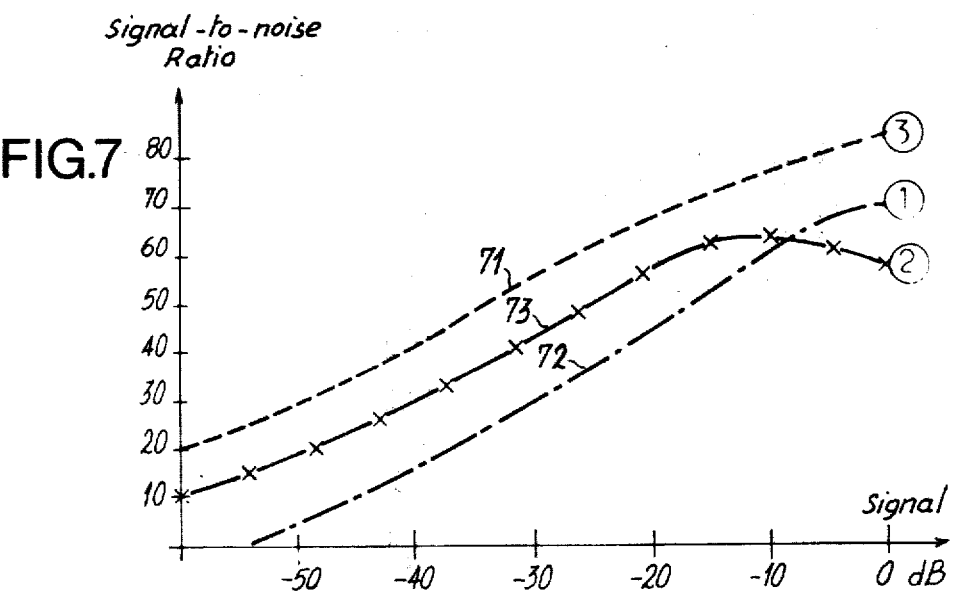
FIG. 7 shows the signal to noise ratio versus the signal amplitude for the coder of the invention and for other coders of the prior art.

The performance of the coder of FIG. 5 is represented by curve 71 in FIG. 7. For comparison purpose, one has also represented the Delta-Sigma Coder of Everard without jamming signal (curve 72) and with jamming signal (curve 73). For the three curves, the sample rate is equal to 2.048 MHz.

It is to be noticed that, as already said, the coder of FIG. 5 only comprises a single operational amplifier and a single adder means.

Figure 8:
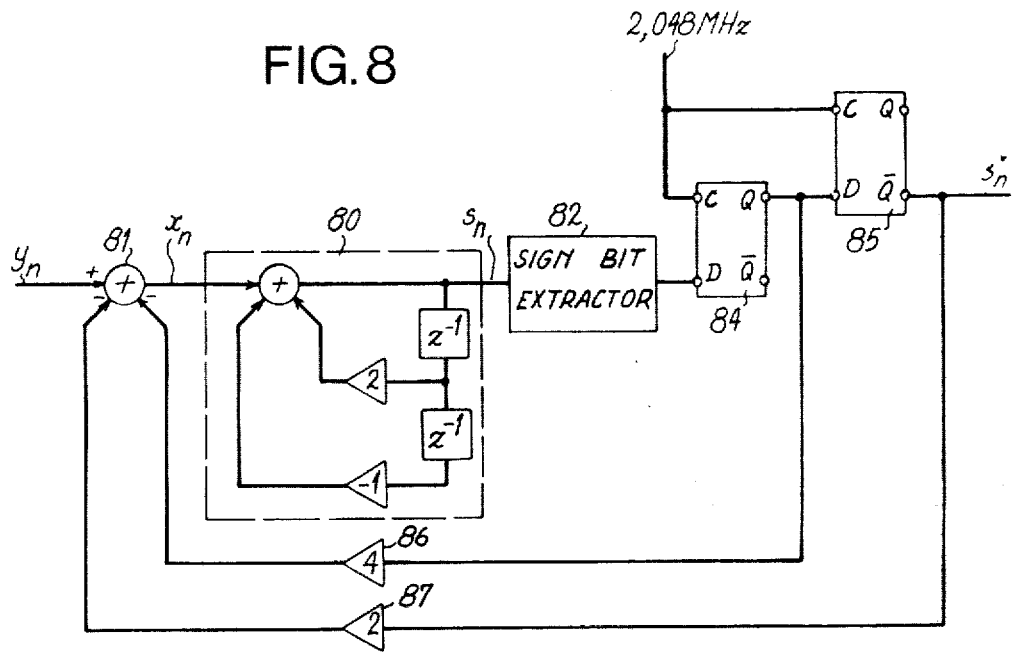
FIGS. 8 and 9 represent the decoder of the invention.

The Delta-Sigma decoder of order two is represented in FIG. 8. In this figure, 80 designates a digital recursive filter of order two having coefficients respectively equal to 2 and −1. This digital filter has a z-transfer function equal to $$1/(1 - z^{-1})^2$$

which corresponds to a double integration. But while the integration in the coder was an analog integration, it is, in the decoder, a digital integration.

The output of digital filter 80 is connected to two cascaded flipflops 84 and 85 having respectively the same function as flipflops 24 and 25 of the coder. These flipflops are connected to adding means 81 at the decoder input through amplifiers 86 and 87, having respectively gains of 2 and 4, and whose rôle is the same as resistors 26 and 27 of the coder.

In adding means 81, two binary numbers are added to the codewords which have different values according to whether the flipflops 84 and 85 are passing or blocked. The states of flipflops 84 and 85 correspond to the sign bits of the reconstituted samples $s_{n-1}^*$ and $s_n^*$.

The addition of these two numbers implements the feedback filter $$C(z) = 2(2 - z^{-1}) = 4 - 2z^{-1} \quad (9')$$

Let us assume that the codewords have the binary point just at the right of their sign bit, i.e. are coded between −1 and +1 and therefore having moduli smaller than or equal to 1.

The following table gives in dependence on the sign bit $y_{n-1}$ of the sample to be decoded and the binary value $s_{n-1}^*$ and $s_n^*$ of the reconstituted samples (or, which is the same thing, in dependence on the states of the flipflops 84 and 85) the number to be added to the codewords and the integral part (part at the left hand of the binary point) of the summation result $b_1 b_2 b_3 b_4$. The bits at the right hand of the binary point remain unchanged since the numbers to be added are integral numbers (2 or 6).

It can be checked in the table that $$b_1 = \text{sign bit of } y_{n-1}$$
$$b_2 = \overline{\text{sign bit of } y_{n-1}}$$
$$b_3 = s_n^*$$
$$b_4 = s_{n-1}^*$$

The finite difference equation of the recursive filter of order two 80 is:

$$s_n^* = 2 s_{n-1}^* - s_{n-2}^* + x_{n-1}$$

x being the sample at the output of the adding means 81. And, on the feedback path, we have:

$$x_{n-1} = y_{n-1} - 4(\text{sign bit of } s_{n-1}^*) + 2(\text{sign bit of } s_{n-2}^*)$$

Figure 9:
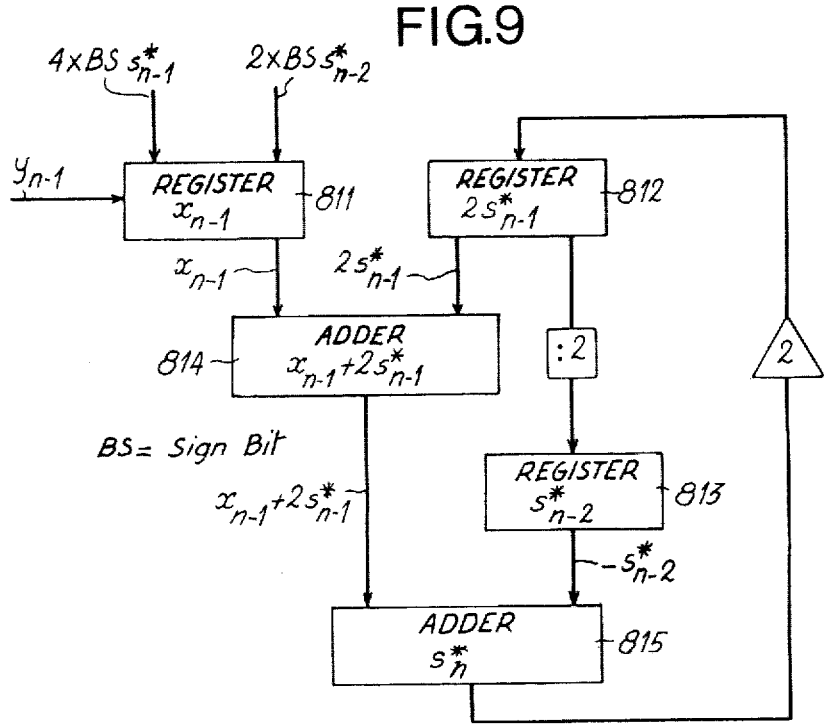

FIG. 9 is a more detailed block diagram of the decoder of FIG. 8.

Register 811 receives $y_{n-1}$, the sign bit of $s_{n-1}*$ multiplied by 4 and the sign bit of $s_{n-2}*$ multiplied by 2 and gives $x_{n-1}$.

Register 812 receives $s_{n-1}*$ multiplied by 2 from adder 815.

Register 813 receives $s_{n-2}*$ divided by 2 from register 812.

Adder 814 gives:

$$x_{n-1} + 2s_{n-1}*$$

And adder 815 gives:

$$x_{n-1} + 2s_{n-1} - s_{n-2}*$$

that is $s_n*$ which, at the subsequent sampling period, is transferred into register 812.

Figure 10:
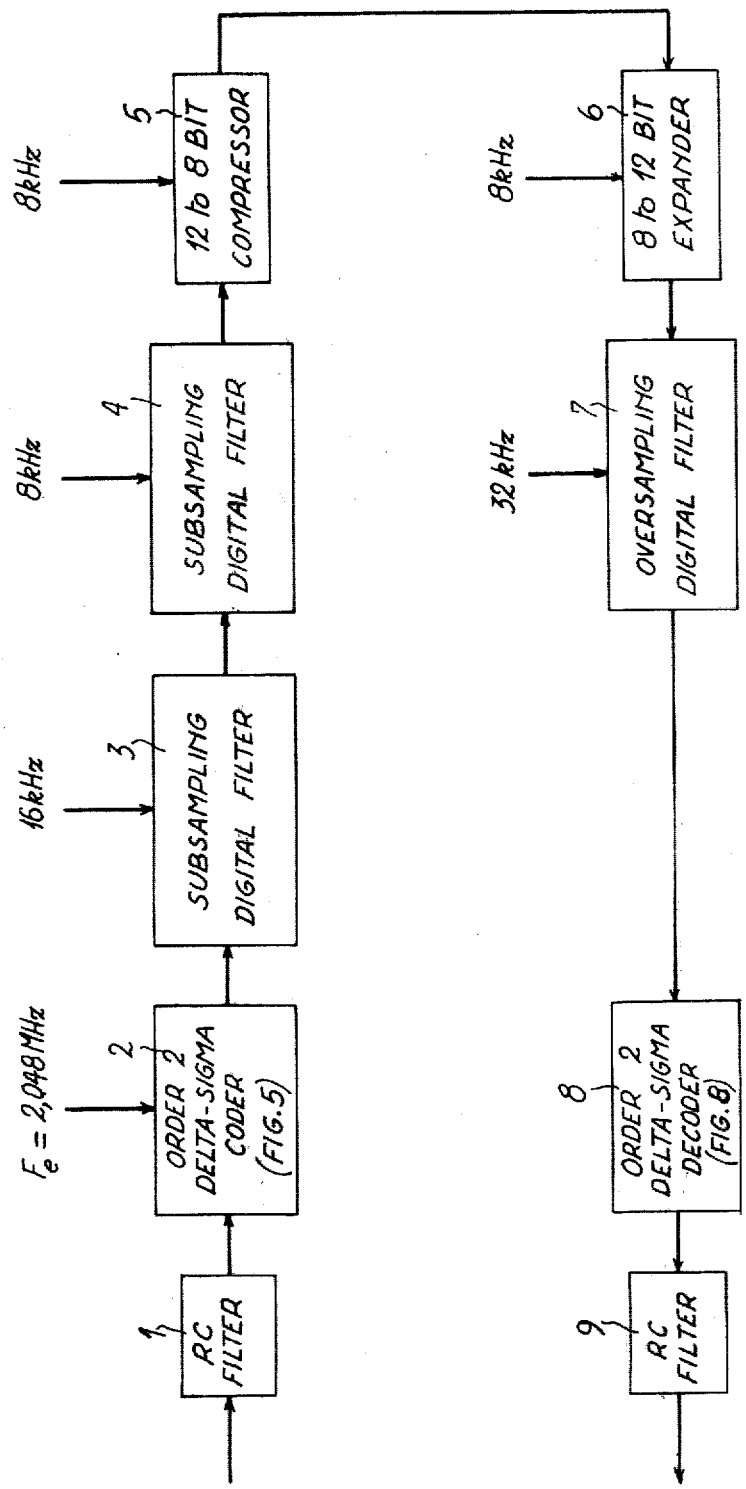
FIG. 10 represents a PCM link embodying the coder of FIG. 5 and the decoder of FIG. 8 together with subsampling and oversampling digital filters and compressor and expander of the number of bits defining the PCM codewords.

Referring now to FIG. 10, an analog to PCM coder unit and a PCM to analog decoder unit for single channel according to the invention are represented.

The coder unit comprises an analog RC filter 1, a Delta-Sigma coder 2 of order two including two analog integrators according to FIG. 5 and operating at 2.048 MHz, a first subsampling digital filter 3 operating at 16 kHz, a second subsampling digital filter 4 operating at 8 kHz and a 12 to 8 bit compressor 5.

The decoder unit comprises a 8 to 12 bit expander 6 operating at 8 kHz, an oversampling digital filter 7 operating at 32 kHz, a Delta-Sigma decoder 8 of order two including two digital integrators according to FIG. 8 and operating at 2.048 MHz and an analog RC filter 9.

| Sign of bit $y_{n-1}$ | $s_{n-1}*$ 0 add | $s_n*$ 0 −2 | $s_{n-1}*$ 0 add | $s_n*$ 1 +6 | $s_{n-1}*$ 1 add | $s_n*$ 0 −6 | $s_{n-1}*$ 1 add | $s_n*$ 1 +2 |
|---|---|---|---|---|---|---|---|---|
| 0 | $b_1\ b_2\ b_3\ b_4$ = | $b_1\ b_2\ b_3\ b_4$ = | $b_1\ b_2\ b_3\ b_4$ = | $b_1\ b_2\ b_3\ b_4$ = |
|  | 0 1 1 1 = 14 | 0 1 0 1 | 0 1 1 0 | 0 1 0 0 |
| 1 | $b_1\ b_2\ b_3\ b_4$ = | $b_1\ b_2\ b_3\ b_4$ = | $b_1\ b_2\ b_3\ b_4$ = | $b_1\ b_2\ b_3\ b_4$ = |
|  | 1 0 1 1 | 1 0 0 1 = 9 | 1 0 1 0 | 1 0 0 0 |

Example:
Let us add −2 to a codeword having a sign bit equal to 0 taking numbers of 4 bits. We substract 0 from the complement of 2 to 16. The result is 14 = 0111;
Let us add +6 to a codeword having a sign bit equal to 1. We substract 1 from the complement of 6 to 16. The result is 1001 = 9.

two analog integrators in the feedback loop of said operational amplifier;
a first and second cascaded flipflops operated at said sampling rate;
a first resistor means connecting the output of said first flipflop to said adding means;
a second resistor means connecting the output of said second flipflop to said adding means; and
output means connected to said second flipflop; and
a Delta-Sigma decoder including two digital integrators;
an adding means receiving a digital signal coded by said coder and connected to said digital integrators;
a first and second cascaded flipflops operating at said sampling rate;
a first amplifier means connecting the output of said first flipflop to said adding means;
a second amplifier means connecting the output of said second flipflop to said adding means; and
output means connected to said second flipflop.

2. Codec as set forth in claim 1, wherein the two analog integrators in the feedback loop of the operational amplifier comprises two serially connected capacitors and a resistor having an extremity connected to the common point of said capacitors and its other extremity grounded.

3. Codec as set forth in claim 1, wherein the two resistors means each comprise a resistor and the resistance of one is double that of the other.

4. Codec as set forth in claim 1, wherein the two resistor means each comprise a resistor, the operational amplifier has an input serial resistor, and the resistor of the first resistor means is equal to said input serial resistor and the resistor of the second resistor means is equal to twice said input serial resistor.

5. Codec as set forth in claim 1, wherein the operational amplifier has an input serial resistor, the two resistors means each comprise a resistor and the resistor of the first resistor means is equal to the fourth of said input serial resistor and the resistor of the second resistor means is equal to half said input serial resistor.

6. Decoder as set forth in claim 1, wherein the first amplifier means and the second amplifier means each comprise an amplifier and the gain of one is twice that of the other.

* * * * *

What we claim is:

1. In an analog to PCM coding and a PCM to analog decoding system, a Delta-Sigma noise-shaping codec operating at a sampling rate of substantially 2 MHz, said codec comprising:
a Delta-Sigma noise-shaping coder including a single operational amplifier;
an adding means receiving an analog signal and connected to said operational amplifier;